Dec. 15, 1959     F. DIESFELD     2,916,944
DEVICE FOR THE SHIFTING OF GEAR SPEEDS IN MOTOR
VEHICLES BY THE USE OF EDDY-CURRENT-CLUTCHES
Filed May 20, 1957     4 Sheets-Sheet 1
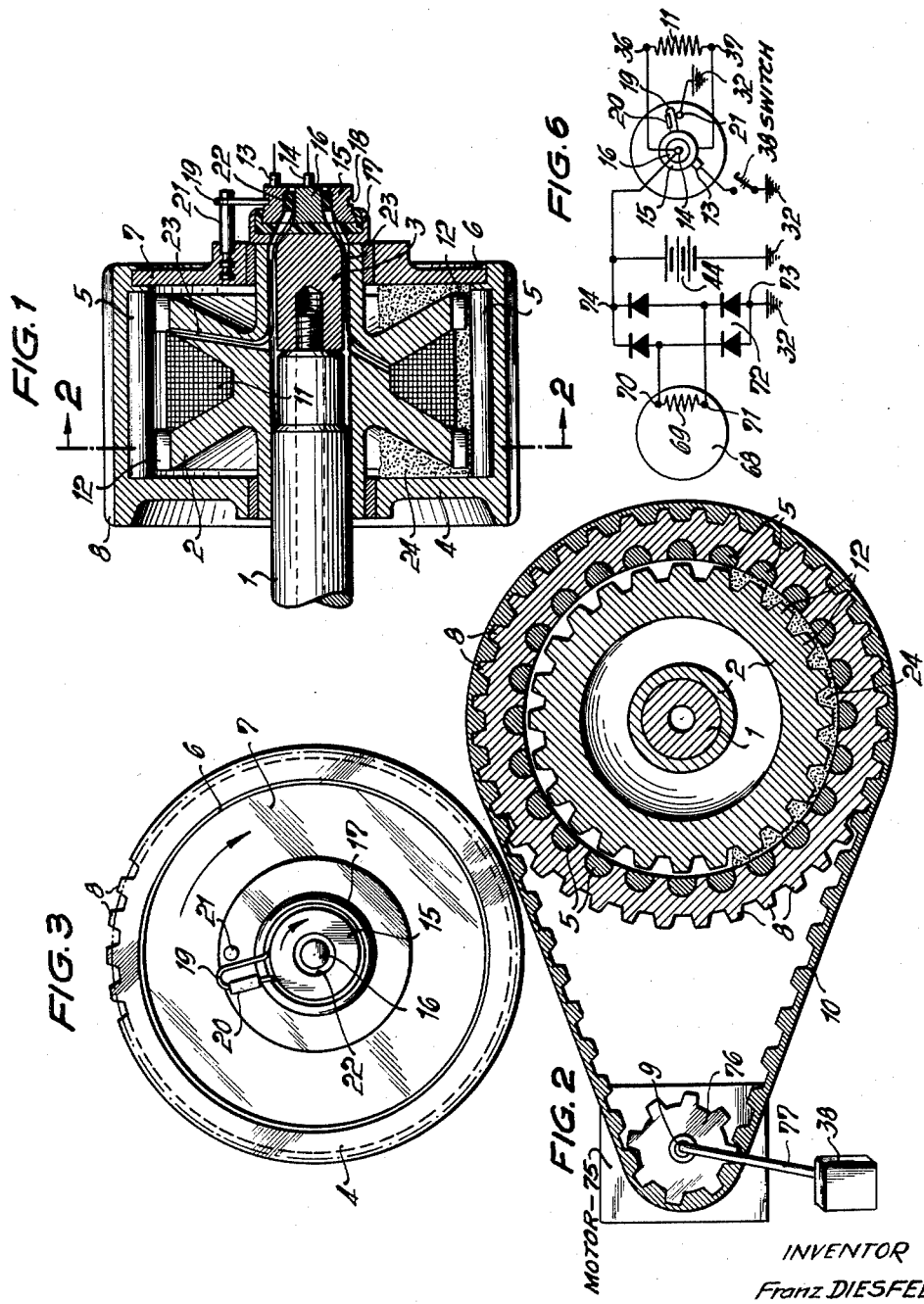
INVENTOR
Franz DIESFELD

INVENTOR
FRANZ DIESFELD

ATTORNEY.

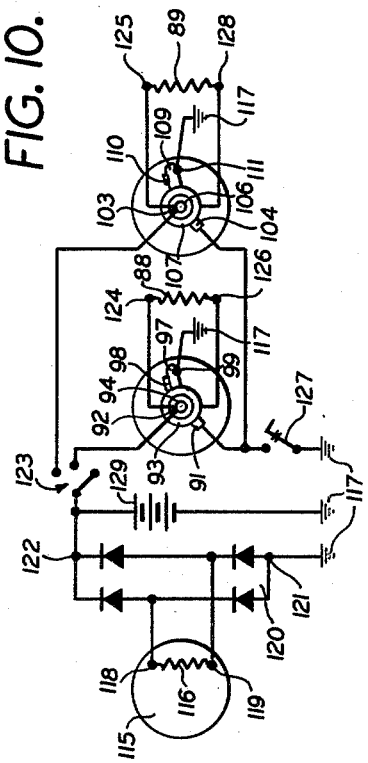

United States Patent Office 2,916,944
Patented Dec. 15, 1959

2,916,944

DEVICE FOR THE SHIFTING OF GEAR SPEEDS IN MOTOR VEHICLES BY THE USE OF EDDY-CURRENT-CLUTCHES

Franz Diesfeld, Kiel, Germany, assignor to J. P. Sauer & Sohn, Gesellschaft mit beschraenkter Haftung, Eckernfoerde, Norderschanze, Germany Application May 20, 1957, Serial No. 660,411

Claims priority, application Germany May 22, 1956

3 Claims. (Cl. 74—472)

The present invention relates to a device for the shifting of gear speeds in motor vehicles by the use of eddy-current-clutches.

Drives in motor vehicles wherein the individual speed stages are shifted electrically are already known to the art. Such drives are operated by the use of electromagnetically actuated laminated clutches, whereby, due to the difficult working of these clutches, the conventional separation clutch between motor and drive is still required. In these clutches the shifting of the individual speed stages is effected without mechanical synchronization by operation of a speed selector. Friction clutches are there provided which are controllable to a certain extent only as to their transmissible momentum, because they cannot operate for a longer time in slipping position, since the clutch lining would burn.

Eddy-current clutches are also known for motor vehicles wherein the air space between the two clutch parts is bridged over by a magnetic liquid or magnetic powder. They have comparatively large dimensions, which are undesirable in a motor vehicle. Furthermore, these clutch arrangements do not operate without extensive current controls, if a soft starting with slip and a certain nil-momentum, thus synchronous run is to be achieved.

It is, therefore, one object of the present invention to provide a device for the shifting of gear speeds in motor vehicles by the use of eddy-current clutches which is sufficiently soft during the starting proceeding, in order to permit of starting of a motor vehicle by using simple and non-complicated control organs and control circuits, respectively, which has furthermore a strong nil-momentum without necessity for changing the exciting current, and which, thus, assures a complete transfer of the motor power with the least space requirement, as well as makes possible a braking effect during descending travel.

It is another object of the present invention to provide a device for the shifting of gear speeds in motor vehicles by the use of eddy-current clutches, wherein the latter serve as a means for coupling up the primary shaft and the secondary shaft, which has electro-magnetically excited poles which are equipped with exciting coils and which are energized from a current source. A speed-responsive electric switch (for example, a switch operated by centrifugal action) is provided, which is coupled to the primary shaft and which connects the exciting coils of the eddy-current clutch with the current source only after passing a predetermined adjustable number of revolutions. A second switch is arranged in parallel with this speed-responsive electric switch, one terminal of said second switch being disposed on that part of the clutch which is connected with the secondary shaft, while its other terminal is arranged on that part of the clutch which is connected with the primary shaft, so that it short circuits the speed-responsive switch as soon as the speed of that part of the clutch connected with the secondary shaft exceeds the speed of that part of the clutch which is connected with the primary shaft.

The eddy-current clutch used herein comprises, by example, a hollow cylinder driven by the motor and rotatable about the secondary shaft and an axially toothed rotary body rigidly disposed on the secondary shaft. The hollow cylinder is of electrically conductive but non-magnetic material and surrounds with its inner peripheral face bar-shaped axially disposed armatures of magnetically soft material. The hollow cylinder carries at its outer periphery coupling means for its drive on the motor side, which coupling means may comprise teeth which receive toothed belts. The inner toothed rotary body, which is completely surrounded by the hollow cylinder, carries one or a plurality of annular exciting coils which are positioned in recessed portions of the rotary body, and to which the exciting current is fed by means of brushes.

For the damping of the condensed magnetic flux which is formed between the poles of the toothed rotary body as well as the bar-shaped armatures of the hollow cylinder and which flux causes oscillations due to the breaking at the relative speed between the two parts, about 40% of the space between the hollow cylinder and the toothed rotary body is filled with dry, magnetically soft iron powder having a ball-shaped grain size of, for instance, less than 0.06 mm. Furthermore, in the position wherein the tooth and armature bar are opposite each other, an improved transition of the flux is brought about.

In order to prevent the penetration of oil from the bearings to the iron powder, the bearing places are sealed by means of simmer rings. As current generators for the exciting current of the annular coils conventional fly-light magnetos may be employed, the current generated in the light coil is rectified; or direct current light machines with battery, the current of which is fed to the exciting coils by means of an adjustable speed-responsive switch (a switch operated by centrifugal force).

It is still another object of the present invention to provide a device for the shifting of gear speeds in motor vehicles by the use of eddy-current clutches wherein a terminal arranged at the part of the clutch secured to the gear shaft (secondary shaft) and which short circuits the speed-responsive switch (centrifugal force switch) comprises a wire member which in its upper part is formed as a clamp, whereby one of the clamp legs carries an insulating member. In its lower part, the two ends of the legs are of semi-circular shape, curved toward each other and project into a recess of a collector ring. The terminal provided at that part of the clutch which is connected with the driving motor comprises a bolt which is engaged either by the bare portion or the insulated portion of the wire member, depending upon the fact which one of the two clutch parts turns faster. If the bare portion of the wire member engages the bolt, the centrifugal force switch is short circuited, so that the clutch can again become operative. This will occur when that part of the clutch which is connected with the secondary shaft runs faster than that part of the clutch which is connected with the primary shaft during a downward movement of the vehicle. On the other hand, if the insulated portion of the wire member engages the bolt, the control of the clutch is controlled now by the speed-responsive switch (centrifugal force switch).

Within the bore of the inner clutch part is disposed a cover-like nut member as an extension of the secondary shaft, which nut member embraces with its flanged edge portion a likewise cover-like insulating member and the bulging edge portion of the collector ring. Further on a shaft stub is disposed a contact member concentrically with the collector ring, which contact member by means of an insulating ring positioned between the shaft stub and the contact member is not only insulated against the ring but is also supported by and secured to the ring. The feeding wires for the exciting coil are also brought to engagement, on the one hand, with the collector ring, and, on the other hand, with the contact member by means of the insulating ring, so that the mounting of the electric feeding wires is very much simplified.

Current source may serve a conventional fly-light magneto, both terminals of the light coil of which are connected with a rectifier. One pole of the rectifier is grounded, while the other pole is connected with one terminal of the exciting coil by means of a brush and the contact member with the eddy-current clutch.

The second terminal of the exciting coil is connected with the collector ring disposed on the eddy-current clutch, which collector ring is grounded either by means of a centrifugal force switch (speed-responsive switch) or by means of the wire member which slides on the collector ring, depending upon the fact which one of the clutch parts turns faster. Furthermore a battery is disposed parallel to the rectifier.

An eddy-current clutch may be coordinated to each individual gear speed stage. It is, however, also possible to provide within the fly-wheel disc of the driving motor one or a plurality of drift parts disposed upon a plurality of hollow shafts arranged concentrically relative to each other, complementary to the number of gear speed stages.

Furthermore, there may be provided a gear stage operating member which effects the switching on and off as well as the excitation of the individual gear speed clutches in response to the speed of the motor vehicle. It is further possible to arrange the clutch in suitable manner between the parts of a planetary gear. Finally there may be arranged relays which are switched on and off in dependence upon each other and upon the speed of the vehicle.

With these and other objects in view which will become apparent in the following detailed description, the present invention will be clearly understood in connection with the accompanying drawings, in which:

Figure 1 is an axial section of an eddy-current clutch;

Fig. 2 is a cross section of the eddy-current clutch along the lines 2—2 of Fig. 1;

Fig. 3 is an end elevation of the eddy-current clutch;

Fig. 6 is a circuit diagram, with an alternating current generator or used in combination with a rectifier in Graetz- or bridge connection;

Fig. 9 is an axial section of eddy current clutches with two drive shafts; and

Fig. 10 is a circuit diagram, with an alternating current generator in connection with a rectifier in Graetz or bridge connection for an arrangement of eddy current clutches with two drive shafts.

Figure 4:
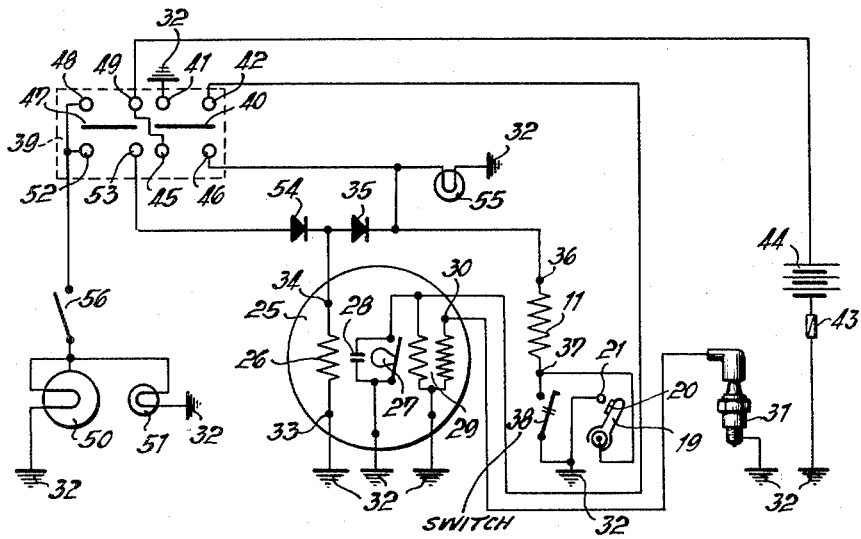
Fig. 4 is a circuit diagram, with an alternating current generator used in combination with the two one-way rectifiers.

Referring now to the drawings, and in particular to Figs. 1 to 3, on the gear shaft 1 (secondary shaft), which is formed at its end as a spline shaft, is pressed into the hub of the toothed rotary body 2 a nut member 3 provided with a cover-like end portion. On the gear end of the hub of the rotary body 2 is rotatably mounted the outer part of the clutch as a hollow cylinder 4. The latter is provided with rod-shaped axially extending armatures 5 of magnetically soft iron which engage the inner periphery of the hollow cylinder 4. The open side of the hollow cylinder 4 is closed up by a cover 7 mounted on the other end of the hub of the rotary body 2 and secured in position by a flange 6. The outer periphery of the hollow cylinder 4 carries a toothing 8 for the toothed belt 10 transmitting the torque from the crankshaft 9 of the motor 75 by means of a pinion 76 to the gear shaft 1 (secondary shaft). The axially toothed rotary body 2, which is surrounded by the hollow cylinder 4, carries an annular exciting coil 11 which is disposed in a recess of the rotary body 2 and which magnetizes the rotary body 2 in such a manner that at the outer symmetrically arranged teeth 12 uniform poles are created. The exciting current is fed to the coil 11 by means of brushes 13, 14, which run on the collector ring 15 and on the contact member 16, respectively, which collector ring 15 is disposed on the nut member 3. The collector ring 15 is secured in position on the free end of the cover-like formed nut member 3, whereby between the collector ring 15 and the nut member 3 an insulating member 17 of likewise cover-like formation and of plastic material is interposed, and the collector ring 15 has its edge portions beaded to form a bulging edge portion. At its outer periphery the collector ring 15 has an annular recess 18 wherein the semi-circular formed ends of the wire member 19 engage. The portion of the wire member 19 which with respect to the direction of rotation is positioned in the rear (see Fig. 3) carries an insulating piece 20, so that the wire member 19 engages either the bare portion or the insulated portion against the bolt 21 which is secured rigidly in the cover 7 and is grounded, depending upon the fact whether the rotary body 2 turns faster or slower than the hollow cylinder 4.

The contact member 16 is disposed concentrically with the outer collector ring 15 and is spaced apart therefrom by a plastic insulating ring 22. The latter serves simultaneously as a means for the fastening of the inner contact member 16 and of the feeding wires 23 for the exciting coils 11, in such a manner that the wires 23 are pressed by it tightly against the collector ring 15 and against the contact member 16, respectively. Furthermore, the contact member 16 is itself tightly clamped by means of the insulating ring 22 disposed between the bulging edge portion arranged at the inner end of the contact member 16 and the bulging edge portion arranged at the outer end of the obliquely oppositely disposed collector ring 15. About 40% of the space between the hollow cylinder 4 and the toothed rotary body 2 is filled with soft magnetic iron powder 24 having a spherical grain size of, for example, less than 0.06 mm.

If an alternating current generator is used (see Fig. 4) for the current generation, the exciting current may be supplied from a fly-light magneto 25, whereby the current is taken from the light coil 26. The fly-light magneto 25 comprises, in known manner, in addition to the light coil 26 the contact breaker 27 with the condenser 28 connected in parallel and the spark coil 29, the high tension terminal 30 of which is connected with the spark plug 31. The circuit is closed by means of the ground 32. One pole 33 of the light coil 26 is connected with the ground 32, while the other pole 34 is connected by means of a one-way rectifier 35 with the terminal 36 of the exciting coil 11. The terminal 37 of the exciting coil 11 may be connected with the ground 32 by means of the switch 38 operated by centrifugal force (speed-responsive switch), which by means of a connection 77 is coupled with the primary shaft 9. Parallel to the switch operated by centrifugal force 38 (speed-responsive switch) is disposed the drag switch comprising the wire member 19 and the bolt 21.

A reversing switch 39 makes it possible to short circuit the ignition, when the bridge 40 connects the terminals 41 and 42 with each other. On the other hand, the battery 44, connected with the fuse 43, is charged when the bridge 40 connects with the terminals 45 and 46 with each other. The second bridge 47 connects upon engagement of the terminals 48 and 49 the head-lights 50 and the tail-lights 51 with the battery 44, while the head-lights 50 and the tail-lights 51 are fed directly from the light coil 26 of the fly-light magneto 25 by means of a second one-way rectifier 54, which thereby acts as a blocking member upon connection of the terminals 52, 53. A bulb 55 indicates that the light coil 26 of the fly-light magneto 25 generates voltage. A switch 56 serves the purpose of connecting the head-lights 50 and the tail-lights 51.

Figure 5:
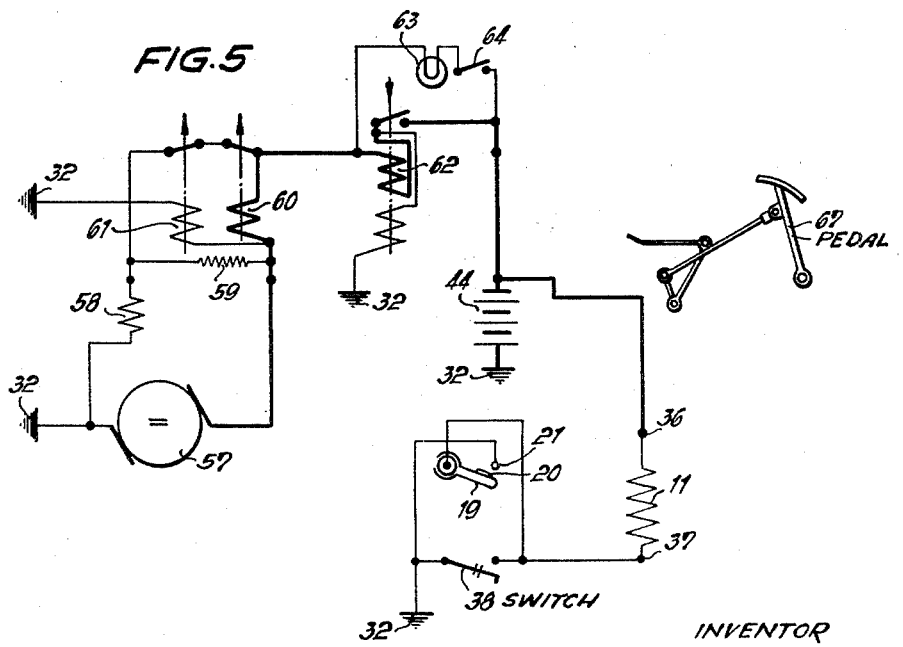
Fig. 5 is a circuit diagram, with a direct current generator.
Figure 7:
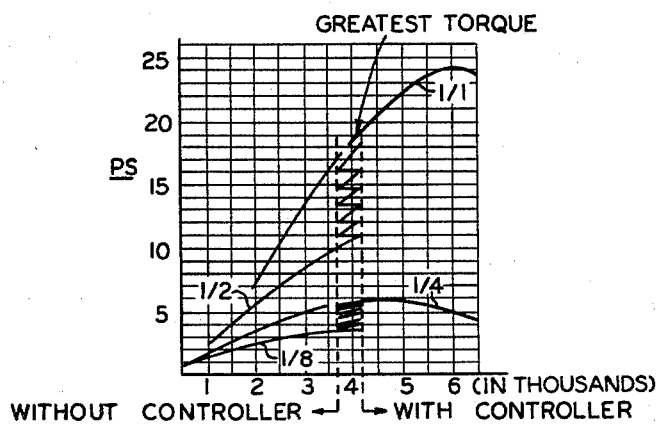
Figs. 7 and 8 are graphs illustrating certain performance characteristics of clutches embodying the present invention.
Figure 8:
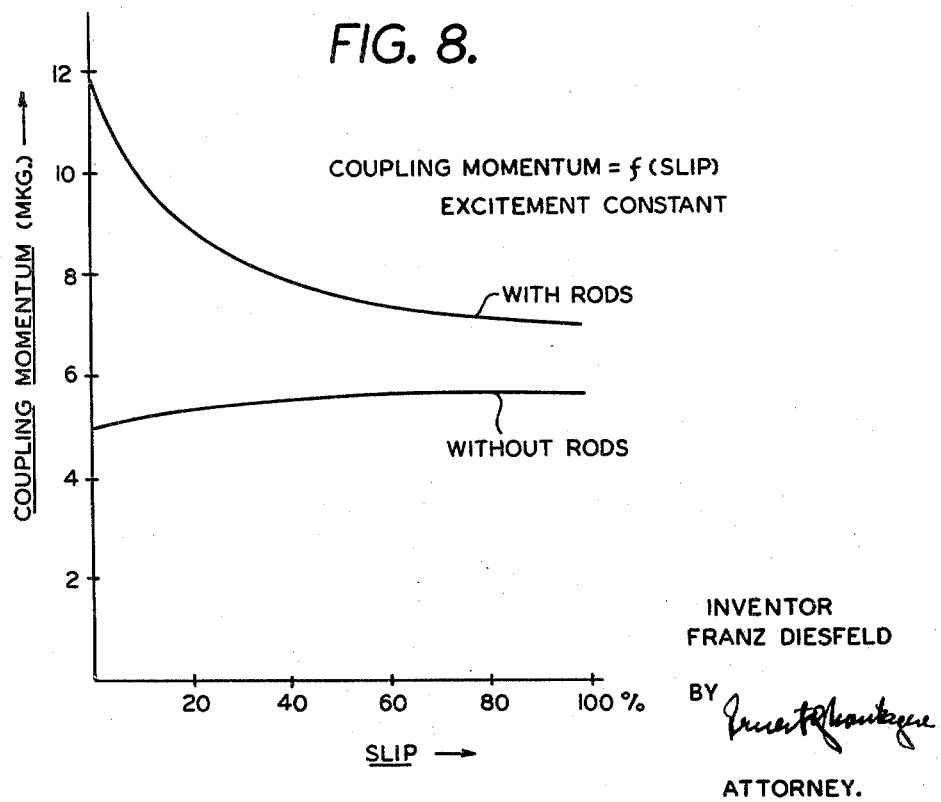

Upon using a direct current generator 57 (see Fig. 5), which in known manner comprises the exciting coil 58, control resistance 59, current regulator 60, voltage regulator 61, reverse switch 62, starter bulb 63 and ignition switch 64, the current is fed to the exciting coil 11. Connected in parallel with the terminal 37 of the exciting coil 11 are the switch 38 operated by the centrifugal force (speed responsive switch) and the drag switch comprising the wire member 19 and the bolt 21, which drag switch is connected at its other side with the ground 32.

Upon using an alternating current generator 68 for the generation of current in combination with a rectifier in Graetz- or bridge connection (see Fig. 6) for feeding the current to the exciting coil 11 of the eddy-current clutch, the coil 69 is insulated against the ground 32. Both of the terminals 70 and 71 are directly connected with a rectifier 72. One of the poles 73 of the rectifier 72 is grounded, while the other pole 74 is connected by means of the brush 14 and the contact member 16 of the eddy-current clutch with the terminal 36 of the exciting coil 11. The other terminal 37 of the exciting coil 11 is connected with the collector ring 15, which may be connected with the ground 32 either by means of a brush 13 and a switch operated by centrifugal force 38 (speed-responsive switch), or by means of a wire member 19 sliding on the collector ring 15 and by means of the bolt 21. Arranged parallel to the rectifier 72 is disposed a battery 44.

Referring now to Figs. 9 and 10, the arrangement of eddy current clutches with two gear shafts (secondary shafts) 78 and 79 for the control of two gear steps is shown, wherein two of the previously described eddy current clutches are constructed together. The outer hollow cylinder of the clutch operates herein simultaneously as a fly-wheel for the driving motor. In the inner gear shaft (secondary shaft) 78, which is formed as a wedge shaft on the clutch side thereof, a nut piece 81 with a cover-like closure is pressed into the hub of the toothed rotary body 80. The second gear shaft 79 slides as outer hollow shaft over the inner gear shaft 78. On the inner ends of the hubs of the rotary bodies 80 and 82, the outer portion of the clutch is rotatably mounted as a hollow cylinder 83, which includes rod-shaped, axially extending armatures of magnetically soft iron, which armatures are disposed at its inner periphery. The hollow cylinder 83 operates simultaneously as fly-wheel for the driving motor. The two open sides of the hollow cylinder 83 are closed up by covers 85 and 86, each of which is mounted on the other end of the hubs of the rotary bodies 80 and 82, respectively. The outer periphery of the hollow cylinder 83 carries teeth 87 for the torque transmitted from the crank shaft 9 of the motor 75 over the pinion 76 to the belt 10 (Fig. 2). Each of the axially toothed rotary bodies 80 and 82, which are enclosed by the hollow cylinder 83, carries an annular exciting coil 88 and 89, supported in a recess of the rotary bodies 80 and 82, which coils 88 and 89 magnetize the rotary bodies 80 and 82 in such a manner that equal poles are formed on the symmetrically disposed teeth 90. The exciting current is fed to the coil 88 by means of the brushes 91, 92, which engage the contact ring 93, which is disposed on the nut piece 81, and the contact piece 94, respectively. The contact ring 93 is retained in the nut piece 81, which is formed cover-like at its free end, by an intermediate of a likewise cover-like insulating piece of elastic artificial material with bending over of its two edges, which grip then over the edge portion of the contact ring 93. At its outer periphery the contact ring 93 has an annular groove 96 in which the half circular bent ends of the clamp-like wire member 97 are disposed. The clamp leg, which is disposed in the rear in the direction of rotation, carries an insulating piece 98, so that the wire member 97 engages the bolts 99, which is rigidly secured to the cover 85 and grounded, either with the blank side or with the insulating side, depending upon the fact whether the rotary body turns faster or slower than the hollow cylinder 83.

The contact piece 94 lies concentrically to the outer contact ring 93 and is separated from the latter by a ring 100 of plastic insulating material. The latter serves simultaneously for the securing of the inner contact piece 94 and of the feeding wires 101 for the exciting coil 88 by pressing the feeding wires 101, 102 therethrough, rigidly against the contact ring 93 and the contact piece 94, respectively. Furthermore, the contact piece 94 is clamped itself by means of the ring 100 of insulating material which is disposed between the edge formation provided on the inner end of the contact piece 94 and the edge formation provided on the outer end of the contact ring 93.

The exciting current is fed to the annular coil 89 over brushes 103 and 104, which engage the contact rings 106 and 107, which are disposed on the outer gear shaft 79 with an intermediate insulating piece 105. The contact ring 107 has at its outer periphery an annular groove 108, in which the half circularly bent ends of the clamp-like wire member 109 are disposed. The clamp leg which projects rearwardly in the direction of rotation, carries an insulating piece 110, so that the wire member 109 engages either the blank or the insulated side of the bolt 111 which is rigidly secured to the cover 86 and which is grounded, depending upon whether the rotary body 82 turns faster or slower than the hollow cylinder 83.

About 40% of the space between the hollow cylinder 83 and the toothed rotary bodies 80 and 82 is filled with soft-magnetic dry iron powder 112 with a ball-shaped core size of for instance less than 0.06 mm. A pinion 113 is disposed on the free end of the inner gear shaft 78 for one of the drive steps, while the outer hollow shaft 79 carries the pinion 114 for the second drive step.

By using an alternating current generator 115 for the current source in connection with a rectifier in Graetz- or bridge connection (Fig. 10) for the current supply for the exciting coils 88 and 89, its windings 116 are insulating against mass. Both terminals 118 and 119 are directly connected with the rectifier 120. One pole 121 of the rectifier 120 is connected with ground 117, while the other pole is connected over a switching device 123, either over the brush 92 and the contact piece 94 with the terminal 124 of the exciting coil 88 or over the brush 103 and the contact ring 106 with the terminal 125 of the exciting coil 89, depending upon the position of the switching device 123. The other terminal 126 of the exciting coil 88 is connected to the contact ring 93, which may be connected either over the brush 91 and a switch responsive to centrifugal force 127, or over a wire member 97 slidingly engaging the contact ring 93 and over the bolt 99 with ground 117. The other terminal 128 of the exciting coil 89 is connected with the contact ring 107 in the same manner, which contact ring 107 is connected either over the brush 104 and the switch 127 responsive to centrifugal force, or over the wire member 109 slidingly engaging the contact ring 107 and over the bolt 111 with ground 117. A battery 129 is disposed parallel to the rectifier 120.

The device described in the present invention for the shifting of gear speed stages of motor vehicles by using eddy-current clutches operates in the following manner:

The motor is started. The switch 38 operated by centrifugal force is set for a predetermined speed yet still open, so that no current is fed to the exciting coil 11. Accordingly, the secondary shaft 1 is, therefore, in uncoupled position.

When the gas flow is now increased, the speed of the motor rises and the switch 38 operated by centrifugal force closes its terminals as soon as the speed, for which the switch has been set, has been reached. Thereby current is fed to the exciting coil 11 of the eddy-current clutch and the motor vehicle starts moving.

If the hollow cylinder 4 is driven by the motor 75 on plane travel or upgrade travel, it rotates faster than the rotary body 2. The wire member 19, which is slidingly mounted on the collector ring 15 connected with the secondary shaft 1, engages, therefore, with its insulated bow-portion 20 the bolt 21. The switch 38 operated by centrifugal force is thus not short circuited by the wire member 19 and can control the feeding of current to the exciting coil 11 of the eddy-current clutch. The switch 38 operated by centrifugal force reopens as soon as its speed falls below the speed previously set for the switch 38, for example by overloading the motor 75, or by reducing the gas feed, which may occur during downgrade travel. This arrangement brings about a disconnection between the motor 75 and the secondary shaft 1 during downgrade travel. It is, therefore, impossible at first to brake the movement. The vehicle runs at first downgrade in uncoupled position. The rotary body 2 turns now faster than the hollow cylinder 4, due to the drive from the rear wheels. The wire member 19 engages, therefore, the bolt 21 with its non-insulated portion, which is connected with the ground 32. The switch 38 operated by centrifugal force is thereby short circuited, so that braking by means of the motor 75 is now possible in spite of the opening of the switch 38.

During starting the motor of one-track motor vehicles the procedure is the same. The starting pedal acts from the rear wheel by means of the secondary shaft 1 upon the rotary body 2. The wire member 19 engages hereby the bolt 21 with its non-insulated portion, which bolt is connected with the ground 32. The exciting coil 11 is thereby fed with current, so that the hollow cylinder 4 is coupled with the rotary body 2 and drives the crankshaft 9 of the motor 75 by means of the toothed belt until the motor starts. The speed of the hollow cylinder 4 increases, thereby and the wire member 19 engages the bolt 21 with its insulated portion 20, so that the feeding of current to the exciting coil 11 is interrupted until the switch 38 closes, when reaching the previously set speed, and, thus, current is fed again to the exciting coil 11 of the rotary body 2.

In the device designed in accordance with the present invention for the shifting of gear speed stages in motor vehicles by the use of eddy-current clutches, the required coupling moment is achieved between the two coupling parts having a relative speed existing therebetween by means of excitation of the one part which generates in the other part an alternating magnetic field and causes eddy-currents. The excitation of the one part can be varied, thereby and adapted to requirements of the travel. If no relative speed exists any more between the two clutch parts, a purely magnetic moment is formed therebetween which couples both parts to each other elastically and without friction.

A grabbing of the clutch does not occur in the eddy-current clutch, rather, it works perfectly smooth and elastically. Rotary oscillations from the motor or shocks from the driving wheels are, therefore, absorbed. As soon as the magnetic coupling condition between the two parts has been reached, there exists from the primary side to the wheels as well as in reverse a tight and yet elastic coupling connection without any difference in speed, so that the vehicle can be braked also with the motor.

Vehicles provided with eddy-current clutches are capable to surmount steeper upgrades than is possible with the aid of mechanical clutches, because the driving motor can run always with its most favorable rotary moment by means of the speed-responsive control of the clutch. It is further possible to travel for a longer period in slip drive without causing defects which are unavoidable with clutches of conventional structure. Further, a more convenient drive results since a clutch pedal is not to be operated.

During downgrade travel the rotary moment of the rear axle is coupled from the secondary side the same as from the primary side, so that it is possible to brake the vehicle by means of the motor without additional means, which are necessary for hydraulic gear shiftings. Distinguished over the hydraulic clutch, the eddy-current clutch does not require a mechanical coupling upon reaching a predetermined speed, since no more residual slip is here present.

It should further be mentioned that the clutch is suited not only for motors of greater power, but is also suitable for motors of smallest power.

While I have disclosed several embodiments of the present invention, it is to be understood that these embodiments are given by example only and not in a limiting sense, the scope of the present invention being determined by the objects and the claims.

What I claim as new and desire to secure by Letters Patent of the United States is:

1. A device for shifting of the gear speed stages of change gears in motor vehicles having a driving motor and a driven part including an eddy-current clutch comprising two rotating bodies disposed concentrically relative to each other and operatively connected between said motor and said driven part, said rotating bodies defining an air space therebetween, a primary shaft and a secondary shaft, connected, respectively, with said rotating bodies, said eddy-current clutch connecting said primary shaft with said secondary shaft and having a plurality of electromagnetically excitable poles equipped with exciting coils, a current source feeding said exciting coils, a speed-responsive first switch coupled with said primary shaft, said switch being adapted to connect said exciting coils of said eddy-current clutch with said current source upon surpassing a predetermined, adjustable speed, and a second switch disposed in parallel with said first switch, one terminal of said second switch being connected with one of said rotating bodies connected with said secondary shaft, the other terminal of said second switch being connected with another of said rotating bodies connected with said primary shaft, thereby, short circuiting said first switch, as soon as the speed of said rotating body connected with said secondary shaft is higher than the speed of said rotating body connected with said primary shaft, and a hollow cylinder of electrically conducting, non-magnetic material, and constituting one of said rotating bodies, rotatably mounted on said secondary shaft and a cover secured to and closing said hollow cylinder, at least two bearings supporting said hollow cylinder, and a plurality of bar-shaped, axially disposed armatures of magnetically soft material embedded at the inner periphery and surrounded by said hollow cylinder, and a plurality of coupling means disposed at the outer periphery of said hollow cylinder for driving connection with the motor side, said hollow cylinder receiving the other one of said rotating bodies, the latter being secured to said secondary shaft and having axially arranged teeth, and also carrying a plurality of exciting coils disposed in a recess of said one of said rotating bodies defined therein, and a collector ring and a contact member mounted on one end of said secondary shaft, brushes projecting from said collector ring and from said contact member, respectively, for feeding exciting current to said exciting coils by means of said collector ring and said contact members, respectively, and dry and soft-magnetic iron powder of ball-shaped grain being disposed in said air space between said magnetically coupled rotating bodies.

2. The device, as set forth in claim 1, wherein said rotating body connected with said secondary shaft carries a wire member of clamp-like shape in its upper, radially projecting portion, and having two leg portions, an insulating member carried by one of said leg portions to constitute an insulating part and the other of said leg portions constituting a blank part, said wire member having at its lower end two semi-circular end portions bent toward each other, which are received in a recess defined in said collector ring, and said rotating body operatively connected with said driving motor carrying a bolt, mounted to turn within the path of said wire member and adapted to engage said insulated part and said blank part of said wire member, respectively, depending upon the greater speed of either one of said rotating bodies.

3. The device, as set forth in claim 1, wherein said eddy-current clutch is coordinated to each of said gear speed stages, said driving motor having a fly-wheel including a driving portion, and a plurality of concentrically disposed hollow shafts are disposed within said driving portion of said fly-wheel, the number of said hollow shafts being complementary to the number of gear speed stages.

References Cited in the file of this patent

UNITED STATES PATENTS

| | | | |
|---|---|---|---|
| 2,519,449 | Findley | Aug. | 22, 1950 |
| 2,525,571 | Winther | Oct. | 10, 1950 |
| 2,539,649 | Winther | Jan. | 30, 1951 |
| 2,718,790 | Hughey | Sept. | 27, 1955 |
| 2,761,538 | Jaeschke | Sept. | 4, 1956 |
| 2,774,452 | Wisman | Dec. | 18, 1956 |